(12) United States Patent
Miyahara

(10) Patent No.: US 9,197,817 B2
(45) Date of Patent: Nov. 24, 2015

(54) IMAGE BLURRING CORRECTION APPARATUS, CONTROL METHOD THEREOF, OPTICAL DEVICE AND IMAGING APPARATUS

(75) Inventor: Shimpei Miyahara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 13/553,956

(22) Filed: Jul. 20, 2012

(65) Prior Publication Data

US 2013/0034345 A1 Feb. 7, 2013

(30) Foreign Application Priority Data

Aug. 2, 2011 (JP) ................. 2011-169598

(51) Int. Cl.
G03B 17/00 (2006.01)
H04N 5/232 (2006.01)
G03B 5/00 (2006.01)

(52) U.S. Cl.
CPC .............. H04N 5/23258 (2013.01); G03B 5/00 (2013.01); H04N 5/2328 (2013.01)

(58) Field of Classification Search
USPC .................. 396/55; 348/208.99, 208.2–208.4, 348/208.12, 208.16
See application file for complete search history.

(56) References Cited

U.S. PATENT DOCUMENTS

| 5,986,698 | A | 11/1999 | Nobuoka | |
|---|---|---|---|---|
| 6,734,902 | B1 * | 5/2004 | Kawahara | 348/208.8 |
| 7,668,447 | B2 * | 2/2010 | Yamazaki | 396/55 |
| 8,289,402 | B2 | 10/2012 | Saito | |
| 8,289,407 | B2 | 10/2012 | Shibata | |
| 8,497,918 | B2 * | 7/2013 | Miyasako | 348/208.99 |
| 2006/0104620 | A1 * | 5/2006 | Ebato | 396/55 |

FOREIGN PATENT DOCUMENTS

| CN | 102316268 A | 1/2012 |
|---|---|---|
| JP | 09-289612 A | 11/1997 |
| JP | 11-308523 A | 11/1999 |
| JP | 2006-311058 A | 11/2006 |
| JP | 2007-072312 A | 3/2007 |
| JP | 2009-069618 A | 4/2009 |
| JP | 2009-217076 A | 9/2009 |
| JP | 2010-118862 A | 5/2010 |

OTHER PUBLICATIONS

JP11-308523 A Machine Translation available from JPO website.*
Office Action dated Sep. 9, 2014, in Chinese Patent Application No. 201210274054.8.
Office Action issued May 8, 2015, in Japanese Patent Application No. 2011-169598.

* cited by examiner

*Primary Examiner* — Minh Phan
(74) *Attorney, Agent, or Firm* — Fitzpatrick, Cella, Harper & Scinto

(57) ABSTRACT

An image blurring correction apparatus includes a correction member for correcting image blur, and a shake detection unit for detecting the shake of the apparatus and outputting a shake signal. The image blurring correction apparatus generates first shake amount data based on the shake signal, and generates second shake amount data, based on the shake signal, with which a higher shake correction effect than that of the first shake amount data can be obtained. The image blurring correction apparatus selects either the first or the second shake amount data based on the shake signal, and calculates a shake correction amount that is a moving amount of the correction member using the selected shake amount data.

45 Claims, 6 Drawing Sheets

IMAGE BLURRING CORRECTION APPARATUS, CONTROL METHOD THEREOF, OPTICAL DEVICE AND IMAGING APPARATUS

BACKGROUND OF THE INVENTION

1. Field of the Invention

The present disclosure relates to an image blurring correction apparatus and a control method thereof, and an optical device and an imaging apparatus that include an imaging blurring correction apparatus.

2. Description of the Related Art

Imaging apparatuses that include an image blurring correction apparatus which detects shaking caused by camera shake and the like of an imaging apparatus and drives an imaging lens so that the shaking is corrected have been known. Moreover, recently, imaging apparatuses have been proposed that include an image blurring correction apparatus which is designed on the assumption that the range of image stabilization is widened on the wide-angle end side at the time of movie recording and that a panning operation or a tilting operation is involved. In this case, the image blurring correction apparatus is designed such that at the time of movie shooting, the cutoff frequency of a filter is set high, and the imaging lens that is driven is prevented from staying near the control edge, thus improving the appearance at the time of movie shooting.

Japanese Patent Laid-Open No. 11-308523 (hereinafter, Document 1) discloses technology that includes an imaging mode that does not involve big camera shaking, a panning operation, or a tilting operation, and in which when that mode is selected by a user, the filter cutoff frequency is set low in order to improve stabilization performance.

However, in Document 1, the user who performs imaging needs to switch between imaging modes depending on the situation, and in the case where the user cannot perform switching appropriately, it is possible that the user cannot shoot a movie that has a good appearance.

SUMMARY OF THE INVENTION

According to one embodiment of the present disclosure, an image blurring correction apparatus is provided that enables stable movie shooting with a good appearance both in the cases where big camera shaking, the panning operation, or the tilting operation is involved, and not involved in an imaging apparatus that performs image blurring correction in movie shooting.

According to one aspect of the present disclosed herein, there is provided an image blurring correction apparatus comprising: a correction member configured to correct image blur; a shake detection unit configured to detect a shake of the apparatus and outputting a shake signal; a first generation unit configured to generate first shake amount data based on the shake signal; a second generation unit configured to generate, based on the shake signal, second shake amount data with which a higher shake correction effect than a shake correction effect of the first shake amount data can be obtained; a selection unit configured to select the first shake amount data or the second shake amount data based on the shake signal; and a calculation unit configured to calculate a shake correction amount which is a moving amount of the correction member using the shake amount data selected by the selection unit.

Also, according to another aspect disclosed herein, there is provided an optical device comprising the above-described image blurring correction apparatus.

Furthermore, according to another aspect disclosed herein, there is provided an imaging apparatus comprising the above-described image blurring correction apparatus.

Furthermore, according to another aspect disclosed herein, there is provided a control method of an image blurring correction apparatus that includes a correction member that corrects image blur, comprising the steps of: detecting a shake of the apparatus and outputting a shake signal; generating first shake amount data based on the shake signal; generating, based on the shake signal, second shake amount data with which a higher shake correction effect than a shake correction effect of the first shake amount data can be obtained; selecting the first shake amount data or the second shake amount data based on the shake signal; and calculating a shake correction amount that is a moving amount of the correction member using the shake amount data selected in the selection step.

Further features of the present disclosure will become apparent from the following description of exemplary embodiments with reference to the attached drawings.

DESCRIPTION OF THE EMBODIMENTS

Hereinafter, an example of preferred embodiments of the present disclosure will be described in detail based on the accompanying drawings.

Figure 1:
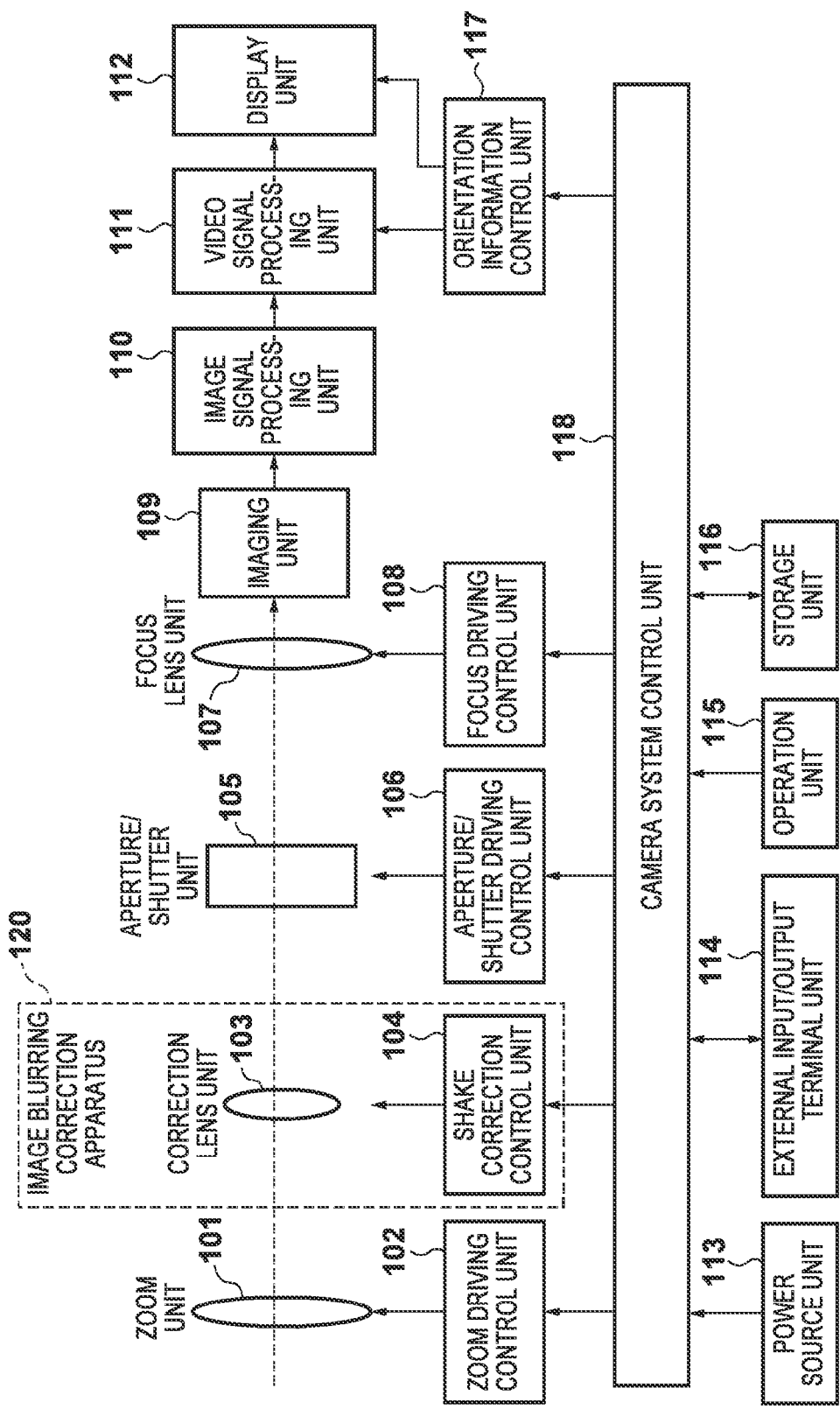
FIG. 1 is a block diagram showing an example of a configuration of an imaging apparatus according to an embodiment.

FIG. 1 is a block diagram that shows a configuration of an imaging apparatus that includes an image blurring correction apparatus according to an embodiment. This imaging apparatus is a digital camera that can capture still images and moving images. In FIG. 1, a zoom unit 101 includes a zoom lens that performs zooming. A zoom driving control unit 102 controls driving of the zoom unit 101. A correction lens unit 103 serves as a correction member, and includes a lens for shake correction (shift lens) that is movable in the direction perpendicular to an optical axis and mechanisms that hold the shift lens. A shake correction control unit 104 controls driving of the correction lens unit 103.

Driving of an aperture/shutter unit 105 is controlled by an aperture/shutter driving control unit 106. A focus lens unit 107 includes a focus lens that performs focus adjustment. A focus driving control unit 108 controls driving of the focus lens unit 107. It should be noted that an image blurring correction apparatus 120 of the present embodiment is configured by the correction lens unit 103 and the shake correction control unit 104.

An imaging unit 109 converts optical images that have passed through lens groups into electrical signals. An image signal processing unit 110 performs processing for converting the electrical signals output from the imaging unit 109 into video signals. A video signal processing unit 111 manipulates video signals output from the image signal processing unit 110 depending on the application. A display unit 112 performs image-display as necessary based on the signals output from the video signal processing unit 111. A power source unit 113 supplies power to the entire system depending on the application. An external input/output terminal unit 114 inputs and outputs communication signals and video signals with an external device. An operation unit 115 includes buttons, switches, and a touch panel and the like for operation of the system by a user. A storage unit 116 stores various types of data such as video information. An orientation information control unit 117 determines the orientation of the imaging apparatus and provides the orientation information to the video signal processing unit 111 and the display unit 112. A camera system control unit 118 controls the entire system.

Next, an overview of operations of the imaging apparatus having the above configuration is described. The operation unit 115 includes a shake correction switch (not shown) that can select a shake correction mode. When the shake correction mode is selected by the shake correction switch, the camera system control unit 118 gives an instruction to the shake correction control unit 104 to execute a shake correction operation, and the shake correction control unit 104 that has received this instruction performs the shake correction operation until an instruction to turn off the shake correction is given.

Moreover, the operation unit 115 includes a capturing mode selection switch (not shown) that enables selection of one of a still image capturing mode and a movie shooting mode, and for each mode at the time of capturing, operating conditions of actuators can be changed. Also, the operation unit 115 includes a playback mode selection switch (not shown) for selecting a playback mode, and when the playback mode is selected, the shake correction operation halts. In addition, the operation unit 115 includes a movie recording switch (not shown). Movie recording starts after the movie recording switch is pressed, and the movie recording ends when the movie recording switch is pressed again during movie recording.

Also, the operation unit 115 includes a shutter release button (not shown) configured to turn on a first switch (SW1) and a second switch (SW2) in the stated order according to the pressed amount of the button. The shutter release button is configured such that the switch SW1 is turned on when the shutter release button is pressed down about halfway, and the switch SW2 is turned on when the shutter release button is pressed down completely. When the switch SW1 is turned on, the focus driving control unit 108 drives the focus lens unit 107 to adjust the focus, and the aperture/shutter driving control unit 106 drives the aperture/shutter unit 105 to set an appropriate exposure amount. When the switch SW2 is turned on, image data obtained from the optical images exposed on the imaging unit 109 is stored in the storage unit 116.

Moreover, the operation unit 115 includes a zooming switch (not shown) that gives an instruction to perform zooming. When a zooming instruction is given with the zooming switch, the zoom driving control unit 102 that has received the instruction via the camera system control unit 118 drives the zoom unit 101 to move to the instructed zoom position. The focus driving control unit 108 drives the focus lens unit 107 to adjust the focus based on the image information that has been sent from the imaging unit 109 and processed by the signal processing units (110 and 111).

Figure 2:
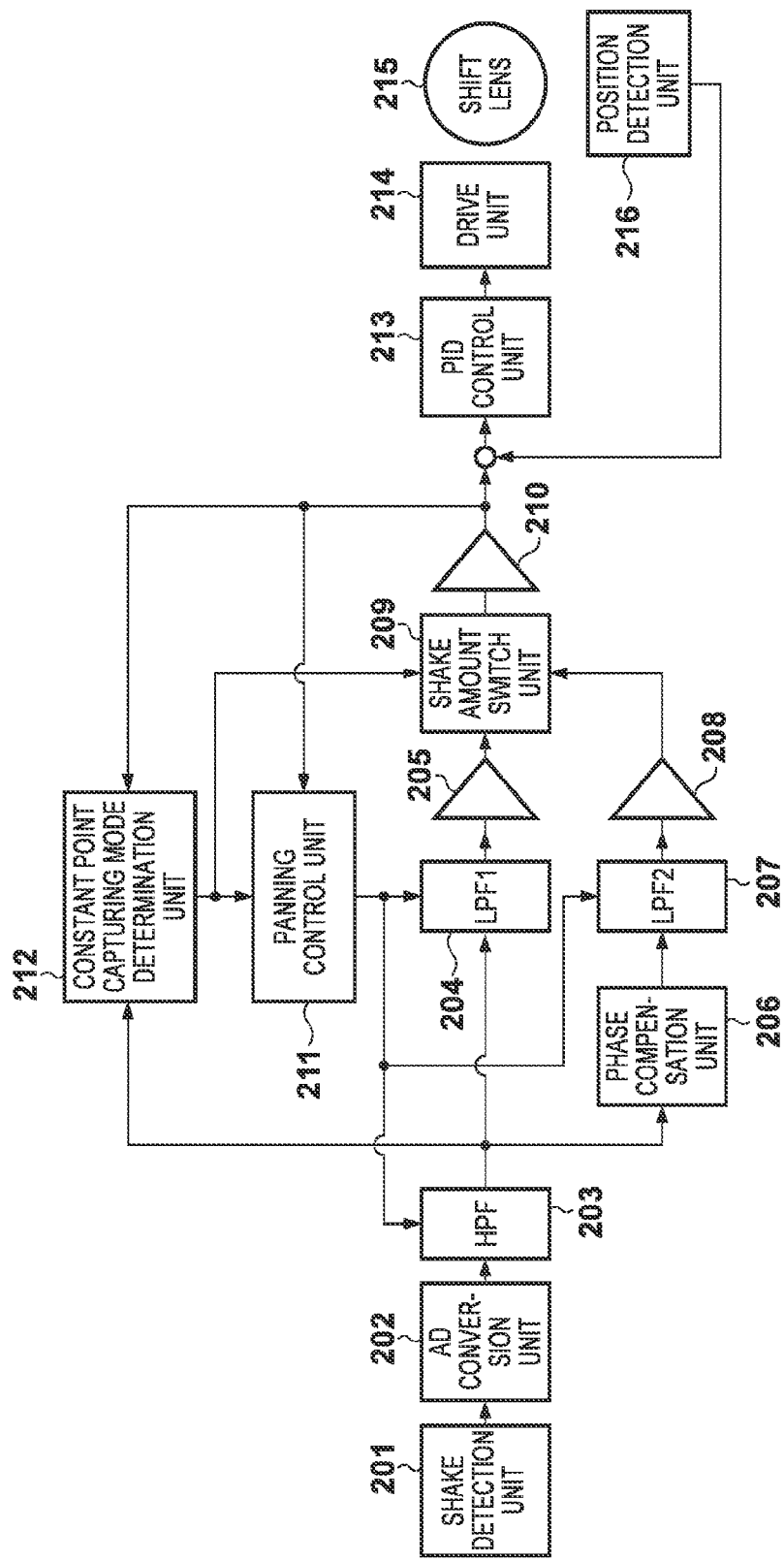
FIG. 2 is a block diagram showing an example of a configuration of a shake prevention control unit according to the embodiment.

FIG. 2 is a block diagram that illustrates a configuration of the image blurring correction apparatus 120 in further detail. It should be noted that the following describes only one axis since the same configuration is applied for both the pitch and yaw directions. A shake detection unit 201 detects shake (e.g. as an angular velocity) using mainly a gyro sensor and outputs it as signal, data, or voltage. In other words, the shake detection unit 201 detects camera shake and the like of the imaging apparatus that includes the image blurring correction apparatus 120. An A/D conversion unit 202 converts output from the shake detection unit 201 into digital data and obtains angular velocity data as a shake signal. A high pass filter 203 removes an offset component and a temperature drift component of the gyro sensor from the angular velocity data. A first generation system that generates first shake amount data based on the shake signal is configured by a system from the high pass filter 203 to a first gain calculation unit 205. Moreover, a second generation system generates second shake amount data, based on the shake signal, with which a higher shake correction effect than that of the first shake amount data generated by the first generation system is obtained, and is configured by a system from the high pass filter 203 to a second gain calculation unit 208.

Output (a shake signal) from the high pass filter 203 is input to a first shake amount calculation unit and a second shake amount calculation unit, and the first shake amount data and the second shake amount data are generated. The first shake amount calculation unit is a calculation unit that includes a first low pass filter 204 and the first gain calculation unit 205. Also, the second shake amount calculation unit is a calculation unit that includes a phase compensation unit 206, a second low pass filter 207, and the second gain calculation unit 208. The first shake amount data is generated based on the shake signal of the shake detection unit 201 by the A/D conversion unit 202, the high pass filter 203, the first low pass filter 204, and the first gain calculation unit 205. Also, the second shake amount data is generated based on the shake signal of the shake detection unit 201 by the A/D conversion unit 202, the high pass filter 203, the phase compensation unit 206, the second low pass filter 207, and the second gain calculation unit 208. The shake amount data is generated with high sensitivity in the second shake amount calculation unit so that shake correction effects generated by the second shake amount calculation unit are higher than shake correction effects generated by the first shake amount calculation unit. This is realized by the introduction of phase compensation or the setting of a low cutoff frequency, and these details will be described later.

The first low pass filter 204 integrates angular velocity data output from the high pass filter 203 and converts the integrated angular velocity data into angular data that is position information to generate the first shake amount. The first gain calculation unit 205 absorbs sensitivity variation of the gyro sensor that is provided in the shake detection unit 201 by multiplying the first shake amount by a gyro gain and outputs the first shake amount data. The phase compensation unit 206 is a filter that compensates for components of phase lag or phase lead of the angular velocity data prior to the integration of the angular velocity data. The shake correction effects are obtained more on the low-pass side of the shake amount compared with the case where phase compensation is not performed by the phase compensation unit 206. The second low pass filter 207 integrates angular velocity data that has undergone the phase compensation in the phase compensation unit 206 and converts the integrated angular velocity data into angular data to generate the second shake amount. The second gain calculation unit 208 absorbs sensitivity variation of the gyro sensor that is provided in the shake detection unit 201 by multiplying the second shake amount by a gyro gain and outputs the second shake amount data. It should be noted that the method of raising the cutoff frequency when panning control is performed is different with the first low pass filter 204 than with the second low pass filter 207. The methods of changing the cutoff frequencies of the high pass filter and two low pass filters will be described later with reference to FIG. 3.

A shake amount switch unit 209 switches between whether the first shake amount data (output from the first gain calculation unit 205) is to be used and whether the second shake amount data (output from the second gain calculation unit 208) is to be used as shake amount data which is to be adopted as shift lens position instruction values. The shake amount switch unit 209 selects and outputs output from the second gain calculation unit 208 to the sensitivity calculation unit 210 when the capturing mode signal indicates the still image capturing mode. In addition, in the movie shooting mode, the shake amount switch unit 209 operates in order to select and output from the second gain calculation unit 208 to the sensitivity calculation unit 210 when it is determined that the current mode is a constant point capturing mode that is described later. Reference numeral 210 denotes a sensitivity calculation unit that converts the first or second shake amount data that has been input to a shift lens position instruction value in accordance with the sensitivity that has been set. This value is a moving amount of the shift lens for the shake correction, and hereinafter it is called the shake correction amount. Sensitivity has different values for every focal distance and is changed whenever there is a change in the focal distance. It should be noted that information on the focal distance and the like are notified by the camera system control unit 118. A panning control unit 211 controls the cutoff frequencies of the high pass filter 203, the first low pass filter 204, and the second low pass filter 207 so that the shift lens 215 does not stay at the control edge while monitoring the shake amount data or the shake correction amount. In the present embodiment, the panning control unit 211 controls the cutoff frequencies by monitoring output from the sensitivity calculation unit 210 (position instruction for the shift lens 215).

A constant point capturing mode determination unit 212 determines whether the constant point capturing mode is on or off while monitoring the shake signal (output from the high pass filter 203) or the shake correction amount (output from the sensitivity calculation 210). The constant point capturing mode will be described later. A PID control unit 213 calculates a drive amount for driving the shift lens 215 based on the shake correction amount from the sensitivity calculation unit 210 and a deviation with respect to the position of the shift lens 215 obtained by a position detection unit 216. A drive unit 214 drives a shift lens 215 based on the drive amount calculated by the PID control unit 213. The shift lens 215 is a lens that cancels out blur in captured images as the correction member by being driven in the direction opposite to camera shaking that has been detected. The position detection unit 216 includes, for example, a Hall effect sensor and detects the position of the shift lens. The correction lens unit 103 is a correction mechanism that reduces image blur by driving the optical system in the imaging apparatus and is configured by, for example, the PID control unit 213, the drive unit 214, the shift lens 215, the position detection unit 216 and the like.

Figure 3:
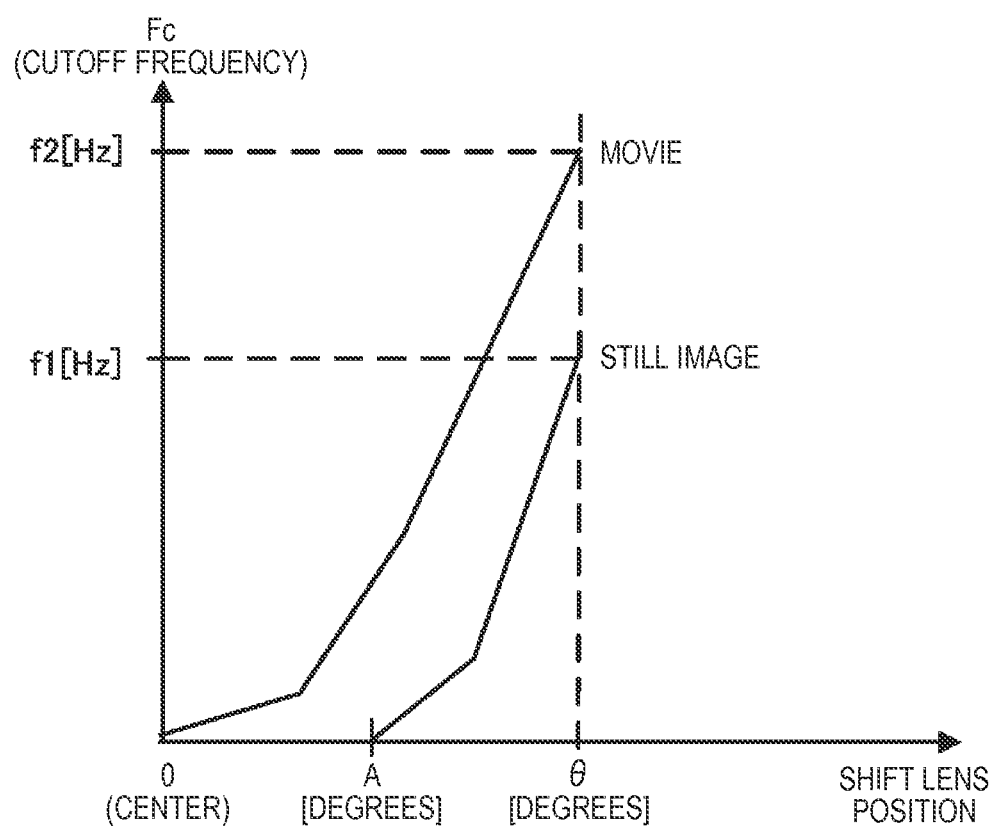
FIG. 3 is a graph illustrating operations of a panning control unit according to the embodiment.

Next, an operation of the panning control unit 211 is described with reference to FIG. 3. In the graph in FIG. 3, the horizontal axis indicates the position of the shift lens 215, and an origin 0 is the center of the shift lens 215. The vertical axis indicates the cutoff frequency relative to the shake signal of the high pass filter 203 or the low pass filters (204 and 207). In the still image capturing mode (second low pass filter 207), the cutoff frequency does not change while the position of the shift lens 215 is between the center and A degrees, which is a given distance from the origin. When the position of the shift lens 215 exceeds A degrees, the cutoff frequency rises until the position of the shift lens 215 reaches θ degrees, which is the control edge, and reaches f1 (Hz) as the maximum degree. Meanwhile, in the movie shooting mode (the first low pass filter 204), the cutoff frequency starts to rise immediately after the shift lens leaves the center, and rises to f2 (Hz) as the maximum degree at the control edge at θ degrees. Here, f2 is greater than f1 (f2>f1).

Generally, since it is assumed that the movie shooting mode involves big camera shaking, a panning operation, or a tilting operation, the cutoff frequency of the first low pass filter 204 is designed in order to readily rise. Therefore, in the movie shooting mode, the shift lens 215 is able to return easily to the center. Accordingly, even if the movie shooting mode involves big camera shaking, in the panning operation or the tilting operation, the shift lens 215 does not stay near the control edge, and the users are able to shoot smooth movie. However, compared to the still image capturing mode, performance of the shake correction is poor in the movie shooting mode. It should be noted that signals indicating the movie shooting mode and the still image capturing mode to the panning control unit 211 are supplied from the camera system control unit 118.

Figure 4:
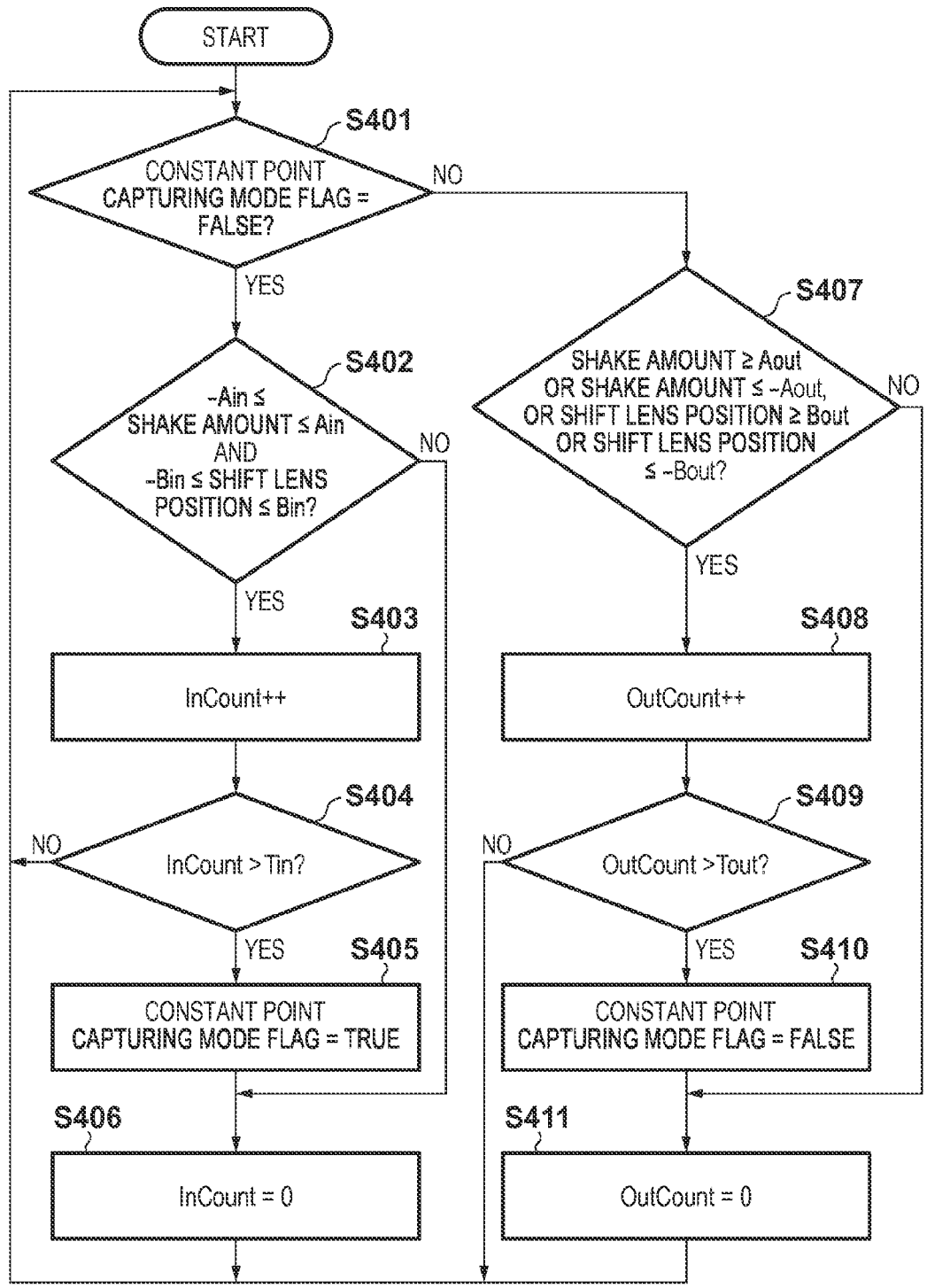
FIG. 4 is a flowchart of a constant point capturing mode determination unit according to the embodiment.

FIG. 4 is a flowchart that shows determination processing regarding the constant point capturing mode performed by the constant point capturing mode determination unit 212. This determination processing is repeatedly executed at a given control cycle and determines whether or not the imaging apparatus is in the constant point capturing state. In step S401, the constant point capturing mode determination unit 212 determines whether or not the current state is the constant point capturing mode state. At the time of the initialization, a regular capturing mode is selected instead of the constant point capturing mode. When the current state is not the constant point capturing mode, the processing proceeds to step S402 and it is determined whether or not the imaging apparatus is in the constant point capturing state. In the present embodiment, when the magnitude of the shake signal is in a first signal value range and a state in which the shake correction amount (shift lens position) output from the sensitivity calculation unit 210 is in a first position range has continued for a predetermined time, the imaging apparatus is determined as being in the constant point capturing state. More specifically, it is determined whether or not the magnitude of the shake signal is less than or equal to a predetermined value Ain and the shift lens position (output from the sensitivity calculation unit 210) is also less than or equal to a predetermined value Bin. In the case of the determination YES in step S402, the constant point capturing mode determination unit 212 increments a constant point capturing mode initiation counter (InCount) in step S403. In the case of determination NO in step S402, the constant point capturing mode determination unit 212 resets the constant point capturing mode initiation counter to zero in step S406. In step S404, the constant point capturing mode determination unit 212 determines whether or not the constant point capturing mode initiation counter is greater than a predetermined value Tin. When the constant point capturing mode initiation counter is greater than the predetermined value Tin, the constant point capturing mode determination unit 212 determines that the imaging apparatus is in the constant point capturing state and sets a constant point capturing mode flag to TRUE in step S405. Then, the constant point capturing mode determination unit 212 resets the constant point capturing mode initiation counter to zero in step S406 and returns to the processing of step S401. When the constant point capturing mode initiation counter is less than or equal to Tin in step S404, the procedure directly returns to the processing of step S401.

Meanwhile, in the case where the current state is the constant point capturing state, the constant point capturing mode determination unit 212 determines whether or not the state of the imaging apparatus has left the constant point capturing mode. In this determination, when the magnitude of the shake signal is outside a second signal value range or a state in which the shake correction amount (shift lens position) output from the sensitivity calculation unit 210 is outside a second position range has continued for a predetermined time, the imaging apparatus is determined as being in the constant point capturing state. In other words, it is determined whether or not the magnitude of the shake signal is greater than or equal to a predetermined value Aout, or the shift lens position is greater than or equal to a predetermined value Bout in step S407. In the case of the determination YES in step S407, the constant point capturing mode determination unit 212 increments a constant point capturing mode ending counter (OutCount) in step S408. In the case of the determination NO in step S407, the constant point capturing mode determination unit 212 resets the constant point capturing mode ending counter to zero in step S411. In step S409, the constant point capturing mode determination unit 212 determines whether or not the constant point capturing mode ending counter is greater than a predetermined value Tout. When the constant point capturing mode ending counter is greater than the predetermined value Tout, the constant point capturing mode determination unit 212 determines that the imaging apparatus is in the regular capturing mode state and sets the constant point capturing mode flag to FALSE in step S410. Then, the constant point capturing mode determination unit 212 resets the constant point capturing mode ending counter to zero in step S411, and returns to the processing of step S401. When the constant point capturing mode ending counter is less than or equal to Tout in step S409, the procedure directly returns to the processing of step S401.

As described above, in the case where the current state is not the constant point capturing mode state, the constant point capturing mode determination unit 212 determines that the imaging apparatus has entered the constant point capturing mode if a state in which the shake signal and the shift lens position are less than or equal to the predetermined values has continued for a predetermined time. Moreover, in the case of the constant point capturing mode, the constant point capturing mode determination unit 212 determines that the imaging apparatus has entered the regular capturing mode if a state in which the shake signal is greater than or equal to the predetermined value or the shift lens position is greater than or equal to the predetermined value has continued for a predetermined time. Here, it is preferable that Ain, Bin, Aout, and Bout, which are determination threshold values, are in the following relations.

$$Ain < Aout$$

$$Bin < Bout \quad \text{Formula 1}$$

By satisfying the above formulas, in other words, by setting the second signal value range greater than the first signal value range and the second position range greater than the first position range, the determinations can be provided with hysteresis and chattering and the like are prevented. It should be noted that the shift signal and the shift lens position (instruction position that is an output from the sensitivity calculation unit 210) are used in the above description for determining whether or not the imaging apparatus is in the constant point capturing mode, but determination conditions are not limited thereto. For example, it is possible to determine whether or not the imaging apparatus is in the constant point capturing mode by using a condition regarding whether or not the shake signal is in a predetermined range. However, in the case of determining "entered the constant point capturing mode", as described above, it is preferable that the shift lens position is added to determination conditions in order to avoid the occurrence of a situation in which the constant point capturing mode is identified at the control edge and the like. In the case of determining "left the constant point capturing mode", it is possible to reference only one of the shake signal and the shift lens position.

Figure 5:
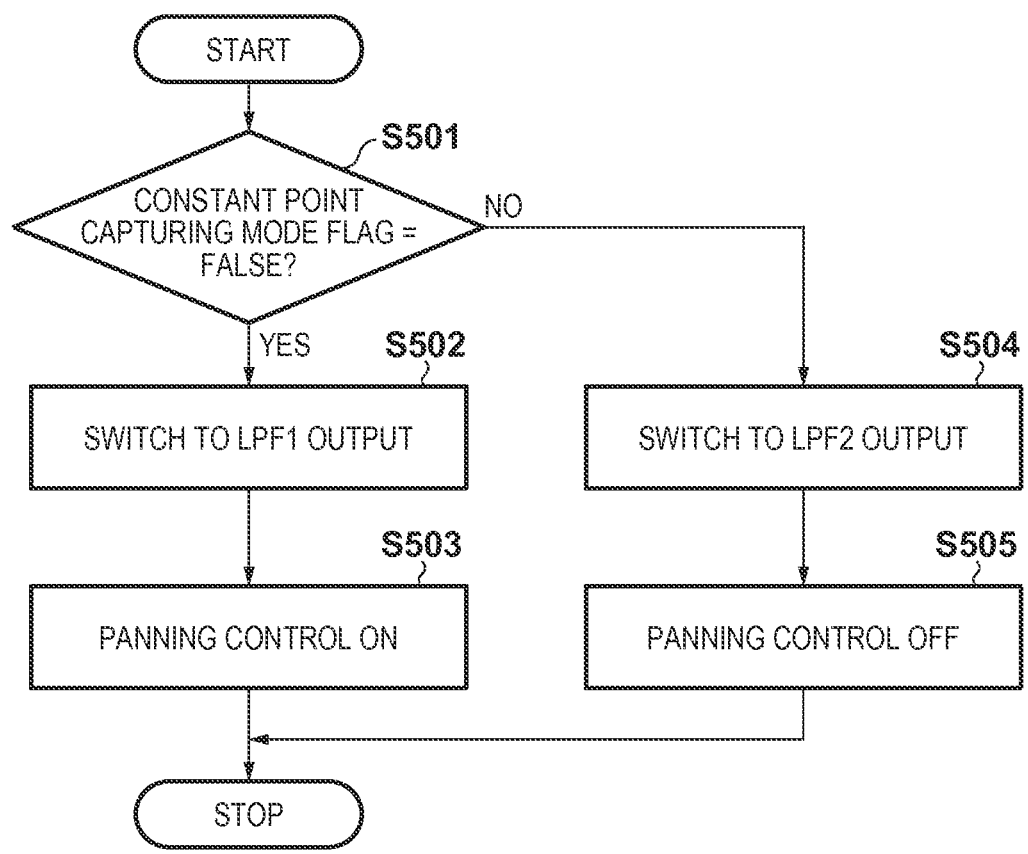
FIG. 5 is a flowchart showing processing of units in a constant point capturing mode according to the embodiment.
Figure 6:
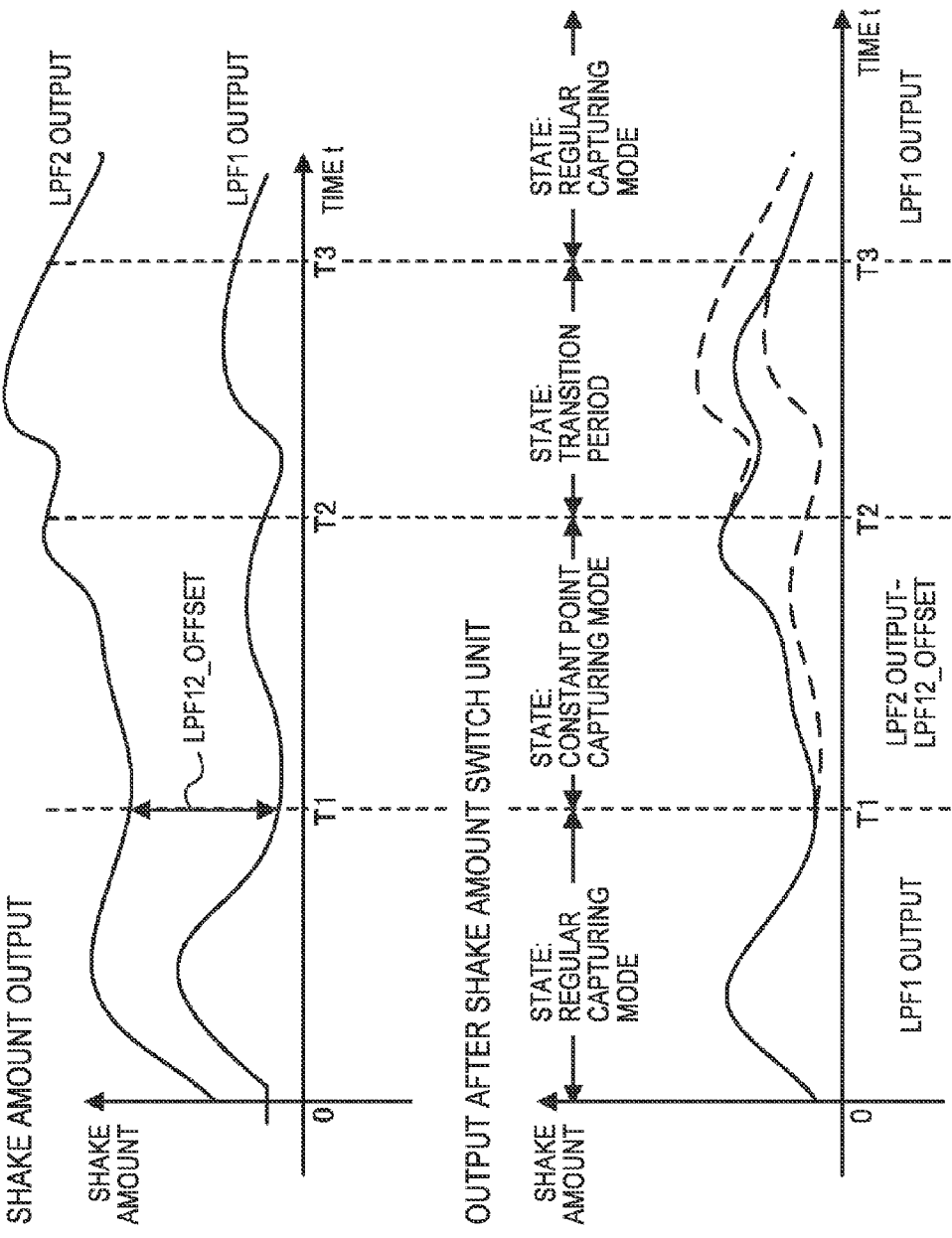
FIG. 6 is a graph illustrating switching of a shake amount according to the embodiment.

FIG. 5 is a flowchart regarding switching between the constant point capturing mode processing and the regular capturing mode processing. The processing is executed once every time the constant point capturing mode flag is switched. In step S501, the shake amount switch unit 209 and the panning control unit 211 determine whether or not the constant point capturing mode flag is FALSE. In the case where the constant point capturing mode flag is FALSE, in other words, in the regular capturing mode, the procedure proceeds to the processing of step S502. In step S502, the shake amount switch unit 209 performs switching such that output from the first gain calculation unit 205 (the first shake amount data) is selected and output. It should be noted that a transition period that is described later using FIG. 6 is provided in order to prevent discontinuity that occurs due to switching of the shake amount that is adopted at this time. Then, in step S503, the panning control unit 211 turns on the panning control. Turning on the panning control means starting the processing in which the filter cutoff frequency is changed according to the shift lens position as shown in FIG. 3.

In the case where the constant point capturing mode flag is TRUE in step S501, in other words, in the constant point capturing mode state, the procedure proceeds to the processing of steps S504 and S505. In step S504, the shake amount switch unit 209 performs switching such that output from the second gain calculation unit 208 (the second shake amount) is selected and output. Calculation of an offset value that is illustrated in FIG. 6 is performed in order to prevent discontinuity that occurs due to switching of the shake amount that is adopted at this time. Moreover, the panning control unit 211 turns off the panning control in step S505. The changing of the filter cutoff frequency according to the shift lens position, which is shown in FIG. 3, stops when the panning control is turned off. It is desirable that the cutoff frequency is fixed at as low a value as possible at this time in order to maximize the stabilization performance. It should be noted that switching can be performed so that panning control for still images is executed instead of turning off the panning control in step S505.

FIG. 6 is a time series graph showing the shake amount switching processing. The regular capturing mode is from time 0 to T1, and the constant point capturing mode is from time T1 to T2. Moreover, the transition period in step S502 mentioned above is from time T2 to T3, and the regular capturing mode is from time T3 onward. Also, the upper graph shows output from the first gain calculation unit 205 and the second gain calculation unit 208. The lower graph is a graph showing the shake amount output from the shake amount switch unit 209. In FIG. 6, the shake amount output from the shake amount switch unit 209 is shown by a solid line. A dashed line from time T1 to T3 shows the first low pass filter output, and the dashed line from time T2 onward shows a signal obtained by subtracting LPF12_Offset that is an offset at the time T1 from the second low pass filter output.

In the case of the regular capturing mode from time 0 to T1, the shake correction amount is generated by inputting output from the first gain calculation unit 205 to the sensitivity calculation unit 210 without any changes, and the shift lens 215 is driven based on the generated shake correction amount. In the case of determination of the constant point capturing mode at time T1, the shake amount switch unit 209 inputs, to the sensitivity calculation unit 210, a signal obtained by a difference between output of the first gain calculation unit 205 and output of the second gain calculation unit 208 (LPF12_Offset) at the time (time T1) being subtracted from output of the second gain calculation unit 208. With this, in the constant point capturing mode, the shake correction amount is generated based on the second shake amount that is obtained by the phase compensation unit 206, the second low pass filter 207, and the second gain calculation unit 208, and then the shift lens 215 is driven. Also, at the time of transition from the regular capturing mode to the constant point capturing mode, it is possible to avoid occurrence of discontinuity points in the shake correction amount and to drive the shift lens 215 continuously. In other words, in the case of determination of the constant point capturing mode at time T1, LPF12_Offset (difference between output of the first gain calculation unit 205 and output of the second gain calculation unit 208 at time T1) is subtracted from output of the second gain calculation unit 208 at every sampling time from time T1 to T2.

In the case of determination of the regular capturing mode at time T2, there is a transition from the constant point capturing mode to the regular capturing mode. Since there is a difference between the signal obtained by subtracting LPF12_Offset from output of the second gain calculation unit 208 at the time and output of the first gain calculation unit 205, discontinuity in the shake amount will be caused if there is simply a switch between the constant point capturing mode and the regular capturing mode. Therefore, the occurrence of discontinuity in the shake amount is prevented by setting a predetermined time from the T2, at which the switch was detected, as a transition period. In the present embodiment, continuity of the shake amount data is maintained by performing weighted addition of the shake amount data from the first gain calculation unit 205 and the shake amount data from the second gain calculation unit 208 (data corrected by LPF12_Offset) and gradually changing the weighting ratio. For example, the shake amount is calculated by using the following formula for the transition period from time T2 to T3 where LPF1OUT is the output signal of the first gain calculation unit 205, LPF2OUT is the output signal of the second gain calculation unit 208, and OutPut is the shake amount data output from the shake amount switch unit 209. It should be noted that time T3 is a time at which a predetermined time has passed from time T2.

$$OutPut = P \times (LPF2OUT - LPF12\_Offset) + Q \times LPF1OUT \quad \text{Formula 2}$$

At time T2, P=1 and Q=0, and P decreases proportionally with time and Q increases proportionally with time from time T2 to T3, and then at time T3, P=0 and Q=1. Then, from time T3 onward, the regular capturing mode is entered, the first low pass filter output becomes the shake amount, the shake correction amount is generated, and the shift lens is driven. For example, where T is the above described predetermined time and t is elapsed time from time T2, the following formulas can be obtained.

$$P = (T-t)/T, \; Q = t/T$$

It should be noted that methods for changing P and Q are not limited to the above.

In the case of movie shooting in which the shake correction control is performed for big camera shaking or that is designed under the assumption that the panning operation or the tilting operation is involved, generally, the mode is designed such that the cutoff frequency of the shake signal filter is set large. This is done to prevent the driven imaging lens from staying near the control edge and to improve the appearance at the time of movie shooting. However, the movie mode that is designed as above has poor stabilization performance compared to a still image mode that is not designed as above. In contrast, in the shake correction apparatus of the embodiment described above, during movie shooting, the capturing mode is automatically switched between the regular capturing mode in the case where big camera shaking, the panning operation or the tilting operation is involved, and the constant point capturing mode in the case where big camera shaking, the panning operation or the tilting operation is not involved. Thus, according to the present embodiment, an imaging apparatus that enables image shooting with a good appearance at all times can be provided both in cases where big camera shaking, the panning operation, or the tilting operation is involved, and not involved.

It should be noted that although the present disclosure has been described using a digital camera that can capture still images and moving images, the image blurring correction apparatus of the present disclosure can be applied to digital video cameras as well. Moreover, the image blurring correction apparatus of the present disclosure can also be applied to optical devices such as lens barrels for imaging lenses and interchangeable lenses for single-lens reflex cameras and video cameras. Also, the image blurring correction apparatus of the present disclosure can be applied to electronic devices such as mobile phones and game devices that use an optical device or imaging apparatus that includes an image blurring correction apparatus.

According to the present disclosure, an imaging apparatus that performs image blurring correction during movie shooting enables stable movie shooting with a good appearance, both in cases where big camera shaking, a panning operation, or a tilting operation is involved, and not involved.

Aspects of the present disclosure can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present disclosure has been described with reference to exemplary embodiments, it is to be understood that the disclosure is not limited to the disclosed exemplary embodiments. The scope of the following claims is to be accorded the broadest interpretation in order to encompass all such modifications and equivalent structures and functions.

This application claims the benefit of Japanese Patent Application No. 2011-169598, filed Aug. 2, 2011, which is hereby incorporated by reference herein in its entirety.

What is claimed is:

1. An image blurring correction apparatus comprising:
a correction member configured to correct image blur;
a shake detection unit configured to detect a shake of the apparatus and output a shake signal;
a first generation unit configured to generate first shake amount data based on the shake signal;
a second generation unit configured to generate, based on the shake signal, second shake amount data with which a higher shake correction effect than a shake correction effect of the first shake amount data can be obtained;
a selection unit configured to select the first shake amount data or the second shake amount data based on the shake signal;
a calculation unit configured to calculate a shake correction amount which is a moving amount of the correction member using the shake amount data selected by the selection unit; and
a determination unit configured to determine whether or not the apparatus is in a constant point capturing state in which a panning control is turned off, based on whether or not a magnitude of the shake signal is in a predetermined shake signal magnitude range and the shake correction amount is in a predetermined shake correction amount range,
wherein the selection unit provides the calculation unit with the second shake amount data if the determination unit determines that the apparatus is in the constant point capturing state, and provides the calculation unit with the first shake amount data if the determination unit determines that the apparatus is not in the constant point capturing state.

2. The apparatus according to claim 1, wherein the predetermined shake signal magnitude range is a first signal value range, and
wherein in a case where the magnitude of the shake signal is in the first signal value range and a position that is indicated by the shake correction amount is in a first position range, the determination unit determines that the apparatus is in the constant point capturing state.

3. The apparatus according to claim 2, wherein in a case where a state, in which the magnitude of the shake signal is in the first signal value range and the shake correction amount is in the first position range, has continued for a predetermined time, the determination unit determines that the apparatus is in the constant point capturing state.

4. The apparatus according to claim 2, wherein in a case where a state, in which the magnitude of the shake signal is outside a second signal value range that is greater than the first signal value range or the shake correction amount is outside a second position range that is greater than the first position range, has continued for a predetermined time, the determination unit determines that the apparatus is not in the constant point capturing state.

5. The apparatus according to claim 1, wherein the first generation unit and the second generation unit integrate the shake signal to generate the first shake amount data and the second shake amount data, respectively, and
wherein the second generation unit includes a phase compensation unit for performing phase compensation for the shake signal prior to the integration of the shake signal.

6. The apparatus according to claim 1, wherein in a case of switching the shake amount data used by the calculation unit from the first shake amount data to the second shake amount data, the selection unit obtains a difference value between the first shake amount data and the second shake amount data at the time of switching, and provides the calculation unit with corrected second shake amount data obtained by subtracting the difference from the second shake amount data.

7. The apparatus according to claim 6, wherein at the time of switching from the corrected second shake amount data to the first shake amount data in accordance with a determination that the apparatus is not in the constant point capturing state, the selection unit provides the calculation unit with shake amount data that is obtained by performing weighted addition of the corrected second shake amount data and the first shake amount data, and
wherein a transition from the corrected second shake amount data is gradually performed to the first shake amount data by changing a weighting that is used in the weighted addition of the corrected second shake amount data and the first shake amount data.

8. The apparatus according to claim 1, further comprising:
a panning control unit configured to change a cutoff frequency of a filter used for generating shake amount data in the first generation unit and the second generation unit based on the shake correction amount,
wherein the panning control unit halts changing of the cutoff frequency in the constant point capturing state.

9. The apparatus according to claim 1, wherein the apparatus can perform movie shooting and still image capturing, and
wherein the selection unit always selects the second shake amount data as the shake amount data to be used by the calculation unit at the time of the still image capturing.

10. An optical device comprising the image blurring correction apparatus according to claim 1.

11. An imaging apparatus comprising the image blurring correction apparatus according to claim 1.

12. The apparatus according to claim 1, further comprising a filter configured to extract a frequency band of the shake correction of the second shake amount data,
wherein a cutoff frequency of the filter is fixed in the constant point capturing state.

13. A control method of an image blurring correction apparatus that includes a correction member that corrects image blur, comprising the steps of:
detecting a shake of the apparatus and outputting a shake signal;
generating first shake amount data based on the shake signal;
generating, based on the shake signal, second shake amount data with which a higher shake correction effect than a shake correction effect of the first shake amount data can be obtained;
selecting the first shake amount data or the second shake amount data based on the shake signal;
calculating a shake correction amount that is a moving amount of the correction member using the shake amount data selected in the selection step; and
determining whether or not the apparatus is in a constant point capturing state in which a panning control is turned off, based on whether or not a magnitude of the shake signal is in a predetermined shake signal magnitude range and the shake correction amount is in a predetermined shake correction amount range,
wherein the selection step provides the calculation step with the second shake amount data if the determination step determines that the apparatus is in the constant point capturing state, and provides the calculation step with the first shake amount data if the determination step determines that the apparatus is not in the constant point capturing state.

14. The method according to claim 13, wherein the predetermined shake signal magnitude range is a first signal value range, and
wherein in a case where the magnitude of the shake signal is in the first signal value range and a position that is indicated by the shake correction amount is in a first position range, the determination step determines that the apparatus is in the constant point capturing state.

15. The method according to claim 14, wherein in a case where a state, in which the magnitude of the shake signal is in the first signal value range and the shake correction amount is in the first position range, has continued for a predetermined time, the determination step determines that the apparatus is in the constant point capturing state.

16. The method according to claim 14, wherein in a case where a state, in which the magnitude of the shake signal is outside a second signal value range that is greater than the first signal value range or the shake correction amount is outside a second position range that is greater than the first position range, has continued for a predetermined time, the determination step determines that the apparatus is not in the constant point capturing state.

17. The method according to claim 13, wherein the first generation step and the second generation step integrate the shake signal to generate the first shake amount data and the second shake amount data, respectively, and
wherein the second generation step includes a phase compensation step for performing phase compensation for the shake signal prior to the integration of the shake signal.

18. The method according to claim 13, wherein in a case of switching the shake amount data used by the calculation step from the first shake amount data to the second shake amount data, the selection step obtains a difference value between the first shake amount data and the second shake amount data at the time of switching, and provides the calculation step with corrected second shake amount data obtained by subtracting the difference from the second shake amount data.

19. The method according to claim 18, wherein at the time of switching from the corrected second shake amount data to the first shake amount data in accordance with a determination that the apparatus is not in the constant point capturing state, the selection step provides the calculation step with shake amount data that is obtained by performing weighted addition of the corrected second shake amount data and the first shake amount data, and
wherein a transition from the corrected second shake amount data is gradually performed to the first shake amount data by changing a weighting that is used in the weighted addition of the corrected second shake amount data and the first shake amount data.

20. The method according to claim 13, wherein the apparatus can perform movie shooting and still image capturing, and
wherein the selecting step always selects the second shake amount data as the shake amount data to be used in the calculating step at the time of the still image capturing.

21. The method according to claim 13, wherein the image blurring correction apparatus comprises a filter configured to extract a frequency band of the shake correction of the second shake amount data,
wherein a cutoff frequency of the filter is fixed in the constant point capturing state.

22. An image blurring correction apparatus comprising:
a correction member configured to correct image blur;
a shake detection unit configured to detect a shake of the apparatus and output a shake signal;
a first generation unit configured to generate first shake amount data based on the shake signal;
a second generation unit configured to generate, based on the shake signal, second shake amount data with which a wider frequency band than a frequency band of a shake correction of the first shake amount data can be obtained;
a selection unit configured to select the first shake amount data or the second shake amount data based on the shake signal;
a calculation unit configured to calculate a shake correction amount which is a moving amount of the correction member using the shake amount data selected by the selection unit; and
a determination unit configured to determine whether or not the apparatus is in a first capturing state in which a panning control is turned off, based on whether or not a magnitude of the shake signal is in a predetermined shake signal magnitude range and the shake correction amount is in a predetermined shake correction amount range,
wherein the selection unit provides the calculation unit with the second shake amount data if the determination unit determines that the apparatus is in the first capturing state, and provides the calculation unit with the first shake amount data if the determination unit determines that the apparatus is not in the first capturing state.

23. The apparatus according to claim 22,
wherein the predetermined shake signal magnitude range is a first signal value range, and
wherein in a case where the magnitude of the shake signal is in the first signal value range and a position that is indicated by the shake correction amount is in a first position range, the determination unit determines that the apparatus is in the first capturing state.

24. The apparatus according to claim 23, wherein in a case where a state, in which the magnitude of the shake signal is in the first signal value range and the shake correction amount is in the first position range, has continued for a predetermined time, the determination unit determines that the apparatus is in the first capturing state.

25. The apparatus according to claim 22, further comprising a filter configured to extract a frequency band of the shake correction of the second shake amount data,
wherein a cutoff frequency of the filter is fixed in the first capturing state.

26. The apparatus according to claim 22, wherein a frequency band of a shake correction of the second shake amount data is wider than a frequency band of a shake correction of the first shake amount data in a lower frequency side.

27. An image blurring correction method comprising the steps of:
detecting a shake of an apparatus and outputting a shake signal;
generating first shake amount data based on the shake signal;
generating, based on the shake signal, second shake amount data with which a wider frequency band than a frequency band of a shake correction of the first shake amount data can be obtained;
selecting the first shake amount data or the second shake amount data based on the shake signal;
calculating a shake correction amount which is a moving amount of a correction member which corrects image blur, using the shake amount data selected in the selecting step; and determining whether or not the apparatus is in a first capturing state in which a panning is turned off, based on whether or not a magnitude of the shake signal is in a predetermined shake signal magnitude range and the shake correction amount is in a predetermined shake correction amount range, wherein the selecting step provides the calculating step with the second shake amount data if the determining step determines that the apparatus is in the first capturing state, and provides the calculation step with the first shake amount data if the determination step determines that the apparatus is not in the first capturing state.

28. The method according to claim 27, wherein the predetermined shake signal magnitude range is a first signal value range, and wherein in a case where the magnitude of the shake signal is in the first signal value range and a position that is indicated by the shake correction amount is in a first position range, the determination step determines that the apparatus is in the first capturing state.

29. The method according to claim 28, wherein in a case where a state, in which the magnitude of the shake signal is in the first signal value range and the shake correction amount is in the first position range, has continued for a predetermined time, the determination step determines that the apparatus is in the first capturing state.

30. The method according to claim 27, wherein the image blurring correction apparatus comprises a filter configured to extract a frequency band of the shake correction of the second shake amount data, wherein a cutoff frequency of the filter is fixed in the first capturing state.

31. The method according to claim 27, wherein a frequency band of a shake correction of the second shake amount data is wider than a frequency band of a shake correction of the first shake amount data in a lower frequency side.

32. An image blurring correction apparatus comprising:
a correction member configured to correct image blur;
a shake detection unit configured to detect a shake of the apparatus and output a shake signal;
a first generation unit configured to generate first shake amount data based on the shake signal;
a second generation unit configured to generate, based on the shake signal, second shake amount data with which a higher shake correction effect than a shake correction effect of the first shake amount data can be obtained;
a selection unit configured to select the first shake amount data or the second shake amount data based on the shake signal;
a calculation unit configured to calculate a shake correction amount which is a moving amount of the correction member using the shake amount data selected by the selection unit; and
a determination unit configured to determine whether or not the apparatus is in a first capturing state in which a panning control is turned off, based on whether or not a magnitude of the shake signal is in a predetermined shake signal magnitude range and the shake correction amount is in a predetermined shake correction amount range,
wherein the selection unit provides the calculation unit with the second shake amount data if the determination unit determines that the apparatus is in the first capturing state, and provides the calculation unit with the first shake amount data if the determination unit determines that the apparatus is not in the first capturing state.

33. A control method of an image blurring correction apparatus that includes a correction member that corrects image blur, comprising the steps of:
detecting a shake of the apparatus and outputting a shake signal;
generating first shake amount data based on the shake signal;
generating, based on the shake signal, second shake amount data with which a higher shake correction effect than a shake correction effect of the first shake amount data can be obtained;
selecting the first shake amount data or the second shake amount data based on the shake signal;
calculating a shake correction amount that is a moving amount of the correction member using the shake amount data selected in the selection step; and
determining whether or not the apparatus is in a first capturing state in which a panning control is turned off, based on whether or not a magnitude of the shake signal is in a predetermined shake signal magnitude range and the shake correction amount is in a predetermined shake correction amount range,
wherein the selection step provides the calculation step with the second shake amount data if the determination step determines that the apparatus is in the first capturing state, and provides the calculation step with the first shake amount data if the determination step determines that the apparatus is not in the first capturing state.

34. An image blurring correction apparatus comprising:
a correction member configured to correct image blur;
a shake detection unit configured to detect a shake of the apparatus and output a shake signal;
a generation unit configured to generate first shake amount data based on the shake signal and second shake amount data with which a wider frequency band than a frequency band of a shake correction of the first shake amount data can be obtained, based on the shake signal;
a calculation unit configured to calculate a shake correction amount which is a moving amount of the correction member using the first shake amount data or the second shake amount data; and
a determination unit configured to determine whether or not the apparatus is in a first capturing state in which a panning control is turned off, based on whether or not a magnitude of the shake signal is in a predetermined shake signal magnitude range and the shake correction amount is in a predetermined shake correction amount range,
wherein the calculation unit calculates a shake correction amount using the second shake amount data if the determination unit determines that the apparatus is in the first capturing state, and the calculation unit calculates a shake correction amount using the first shake amount data if the determination unit determines that the apparatus is not in the first capturing state.

35. The apparatus according to claim 34,
wherein the predetermined shake signal magnitude range is a first signal value range, and
wherein in a case where the magnitude of the shake signal is in the first signal value range and a position that is indicated by the shake correction amount is in a first position range, the determination unit determines that the apparatus is in the first capturing state.

36. The apparatus according to claim 35, wherein in a case where a state, in which the magnitude of the shake signal is in the first signal value range and the shake correction amount is in the first position range, has continued for a predetermined time, the determination unit determines that the apparatus is in the first capturing state.

37. The apparatus according to claim 34, further comprising a filter configured to extract a frequency band of the shake correction of the second shake amount data,
wherein a cutoff frequency of the filter is fixed in the constant point capturing state.

38. The apparatus according to claim 34, wherein a frequency band of a shake correction of the second shake amount data is wider than a frequency band of a shake correction of the first shake amount data in a lower frequency side.

39. An image blurring correction method comprising the steps of:
detecting a shake of an apparatus and outputting a shake signal;
generating first shake amount data based on the shake signal;
generating, based on the shake signal, second shake amount data with which a wider frequency band than a frequency band of a shake correction of the first shake amount data can be obtained;
calculating a shake correction amount which is a moving amount of a correction member which corrects image blur, using the shake amount data selected in the selecting step; and
determining whether or not the apparatus is in a first capturing state in which a panning is turned off, based on whether or not a magnitude of the shake signal is in a predetermined shake signal magnitude range and the shake correction amount is in a predetermined shake correction amount range,
wherein the selecting step provides the calculating step with the second shake amount data if the determining step determines that the apparatus is in the first capturing state, and provides the calculation step with the first shake amount data if the determination step determines that the apparatus is not in the first capturing state.

40. The method according to claim 39,
wherein the predetermined shake signal magnitude range is a first signal value range, and
wherein in a case where the magnitude of the shake signal is in the first signal value range and a position that is indicated by the shake correction amount is in a first position range, the determination step determines that the apparatus is in the first capturing state.

41. The method according to claim 40, wherein in a case where a state, in which the magnitude of the shake signal is in the first signal value range and the shake correction amount is in the first position range, has continued for a predetermined time, the determination step determines that the apparatus is in the first capturing state.

42. The method according to claim 39, further comprising a step of extracting a frequency band of the shake correction of the second shake amount data using a filter,
wherein a cutoff frequency of the filter is fixed in the constant point capturing state.

43. The method according to claim 39, wherein a frequency band of a shake correction of the second shake amount data is wider than a frequency band of a shake correction of the first shake amount data in a lower frequency side.

44. An image blurring correction apparatus comprising:
a correction member configured to correct image blur;
a shake detection unit configured to detect a shake of the apparatus and output a shake signal;
a first generation unit configured to generate first shake amount data based on the shake signal;
a second generation unit configured to generate, based on the shake signal, second shake amount data with which a higher shake correction effect than a shake correction effect of the first shake amount data can be obtained;
a selection unit configured to select the first shake amount data or the second shake amount data based on the shake signal;
a calculation unit configured to calculate a shake correction amount which is a moving amount of the correction member using the shake amount data selected by the selection unit; and
a determination unit configured to determine whether or not the apparatus is in a constant point capturing state in which a panning control is turned off, based on whether or not a magnitude of the shake signal is in a predetermined range,
wherein the selection unit provides the calculation unit with the second shake amount data if the determination unit determines that the apparatus is in the constant point capturing state, and provides the calculation unit with the first shake amount data if the determination unit determines that the apparatus is not in the constant point capturing state, and
wherein in a case of switching the shake amount data used by the calculation unit from the first shake amount data to the second shake amount data, the selection unit obtains a difference value between the first shake amount data and the second shake amount data at the time of switching, and provides the calculation unit with corrected second shake amount data obtained by subtracting the difference from the second shake amount data.

45. A control method of an image blurring correction apparatus that includes a correction member that corrects image blur, comprising the steps of:
detecting a shake of the apparatus and outputting a shake signal;
generating first shake amount data based on the shake signal;
generating, based on the shake signal, second shake amount data with which a higher shake correction effect than a shake correction effect of the first shake amount data can be obtained;
selecting the first shake amount data or the second shake amount data based on the shake signal;
calculating a shake correction amount that is a moving amount of the correction member using the shake amount data selected in the selection step; and
determining whether or not the apparatus is in a constant point capturing state in which a panning control is turned off, based on whether or not a magnitude of the shake signal is in a predetermined range,
wherein the selection step provides the calculation step with the second shake amount data if the determination step determines that the apparatus is in the constant point capturing state, and provides the calculation step with the first shake amount data if the determination step determines that the apparatus is not in the constant point capturing state,
wherein in a case of switching the shake amount data used by the calculation step from the first shake amount data to the second shake amount data, the selection step obtains a difference value between the first shake amount data and the second shake amount data at the time of switching, and provides the calculation step with corrected second shake amount data obtained by subtracting the difference from the second shake amount data.

* * * * *